US011226607B2

(12) United States Patent
Shogaki et al.

(10) Patent No.: US 11,226,607 B2
(45) Date of Patent: Jan. 18, 2022

(54) ABNORMALITY DETERMINATION SYSTEM, DATA TRANSMITTER-RECEPTOR, MOTOR CONTROLLER, AND METHOD FOR DETERMINING ABNORMALITY

(71) Applicant: KABUSHIKI KAISHA YASKAWA DENKI, Kitakyushu (JP)

(72) Inventors: Takaaki Shogaki, Kitakyushu (JP);
Takeshi Nagata, Kitakyushu (JP);
Tadashi Okubo, Kitakyushu (JP);
Naoki Mizuno, Kitakyushu (JP);
Atsunobu Sakata, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 578 days.

(21) Appl. No.: 15/948,164

(22) Filed: Apr. 9, 2018

(65) Prior Publication Data
US 2019/0129372 A1 May 2, 2019

(30) Foreign Application Priority Data

Oct. 27, 2017 (JP) .............................. JP2017-207881

(51) Int. Cl.
*G05B 19/05* (2006.01)
*G05B 23/02* (2006.01)

(52) U.S. Cl.
CPC ....... *G05B 19/058* (2013.01); *G05B 23/0232* (2013.01); *G05B 2219/1134* (2013.01); *G05B 2219/1214* (2013.01)

(58) Field of Classification Search
CPC .................................................. G05B 19/058
See application file for complete search history.

(56) References Cited

U.S. PATENT DOCUMENTS

2016/0156288 A1\* 6/2016 Sawamura ................ H02P 3/04
318/372
2017/0242076 A1 8/2017 Yoshiura
2017/0264233 A1\* 9/2017 Yamawaki ............. H02P 29/68

FOREIGN PATENT DOCUMENTS

| CN | 10 2012 200 199 A1 | 7/2013 |
| CN | 104020310 A | 9/2014 |
| CN | 205786827 U | 12/2016 |

(Continued)

OTHER PUBLICATIONS

Japanese Office Action dated May 21, 2019 in Patent Application No. 2017-207881, 7 pages (with unedited computer generated English translation).

(Continued)

*Primary Examiner* — Manuel A Rivera Vargas
(74) *Attorney, Agent, or Firm* — Oblon, McClelland, Maier & Neustadt, L.L.P.

(57) ABSTRACT

An abnormality determination system includes motor control circuitry that controls a motor of a motor-driven machine based on a motor control command, and compares operation data of the motor obtained in controlling the motor with reference data stored in a storage to determine whether the motor driven machine has an operation abnormality, upper-level control circuitry that transmits the motor control command to the motor control circuitry, and data transceiver circuitry that transmits and receives the reference data and the operation data to and from the motor control circuitry.

18 Claims, 12 Drawing Sheets

(56) References Cited

FOREIGN PATENT DOCUMENTS

| JP | 5480440 B | 2/2014 |
| JP | 2015-139347 A | 7/2015 |
| JP | 2016-101643 A | 6/2016 |
| JP | 2017-151598 A | 8/2017 |
| JP | 2017-163806 A | 9/2017 |

OTHER PUBLICATIONS

Office Action dated Nov. 6, 2018 in Japanese Patent Application No. 2017-207881, 12 pages (with unedited computer generated English translation).

Office Action dated Jun. 16, 2021 in China Patent Application No. 201810213893.6 (with English translation); 19 pgs.

Office Action dated Dec. 17, 2020 in German Patent Application No. 10 2018 206 440.7 (with English translation); 14 pgs.

* cited by examiner

FIG. 4  Operational Phase (at the time of observation driving)

us 11,226,607 B2

ABNORMALITY DETERMINATION SYSTEM, DATA TRANSMITTER-RECEPTOR, MOTOR CONTROLLER, AND METHOD FOR DETERMINING ABNORMALITY

CROSS-REFERENCE TO RELATED APPLICATIONS

The present application claims priority under 35 U.S.C. § 119 to Japanese Patent Application No. 2017-207881, filed Oct. 27, 2017. The contents of this application are incorporated herein by reference in their entirety.

BACKGROUND

Field of the Invention

The embodiments disclosed herein relate to an abnormality determination system, a data transmitter-receptor, a motor controller, and a method for determining an abnormality.

Discussion of the Background

JP 5480440B discloses an abnormality sign detector that obtains time-series data from a plurality of apparatuses and/or devices included in machinery or equipment and that determines whether there is an abnormality sign based on the time-series data.

SUMMARY

According to one aspect of the present invention, an abnormality determination system includes motor control circuitry that controls a motor of a motor-driven machine based on a motor control command, and compares operation data of the motor obtained in controlling the motor with reference data stored in a storage to determine whether the motor driven machine has an operation abnormality, upper-level control circuitry that transmits the motor control command to the motor control circuitry, and data transceiver circuitry that transmits and receives the reference data and the operation data to and from the motor control circuitry.

According to another aspect of the present invention, an apparatus includes data transmitter-receptor that receives reference data from data management circuitry, transmits the received reference data to motor control circuitry, receives operation data from the motor control circuitry, and transmits the received operation data to the data management circuitry.

According to yet another aspect of the present invention, an apparatus includes motor control circuitry that controls a motor of a motor-driven machine and determines whether the motor-driven machine has an operation abnormality by comparing observation-time operation data of the motor with reference data. The observation-time operation data is obtained while the motor-driven machine is being driven for observation purposes, the reference data is calculated based on normal operation data of the motor obtained while the motor driven machine is being driven normally.

According to still another aspect of the present invention, a method for determining an abnormality in a motor-driven machine includes obtaining observation-time operation data of a motor of the motor-driven machine, the observation-time operation data being operation data obtained while the motor driven machine is being driven for observation purposes, determining whether the observation-time operation data has a data abnormality using reference data generated by machine learning, and determining whether the motor driven machine has an operation abnormality based on an acquisition situation in which the observation-time operation data, determined as having the data abnormality, was obtained.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
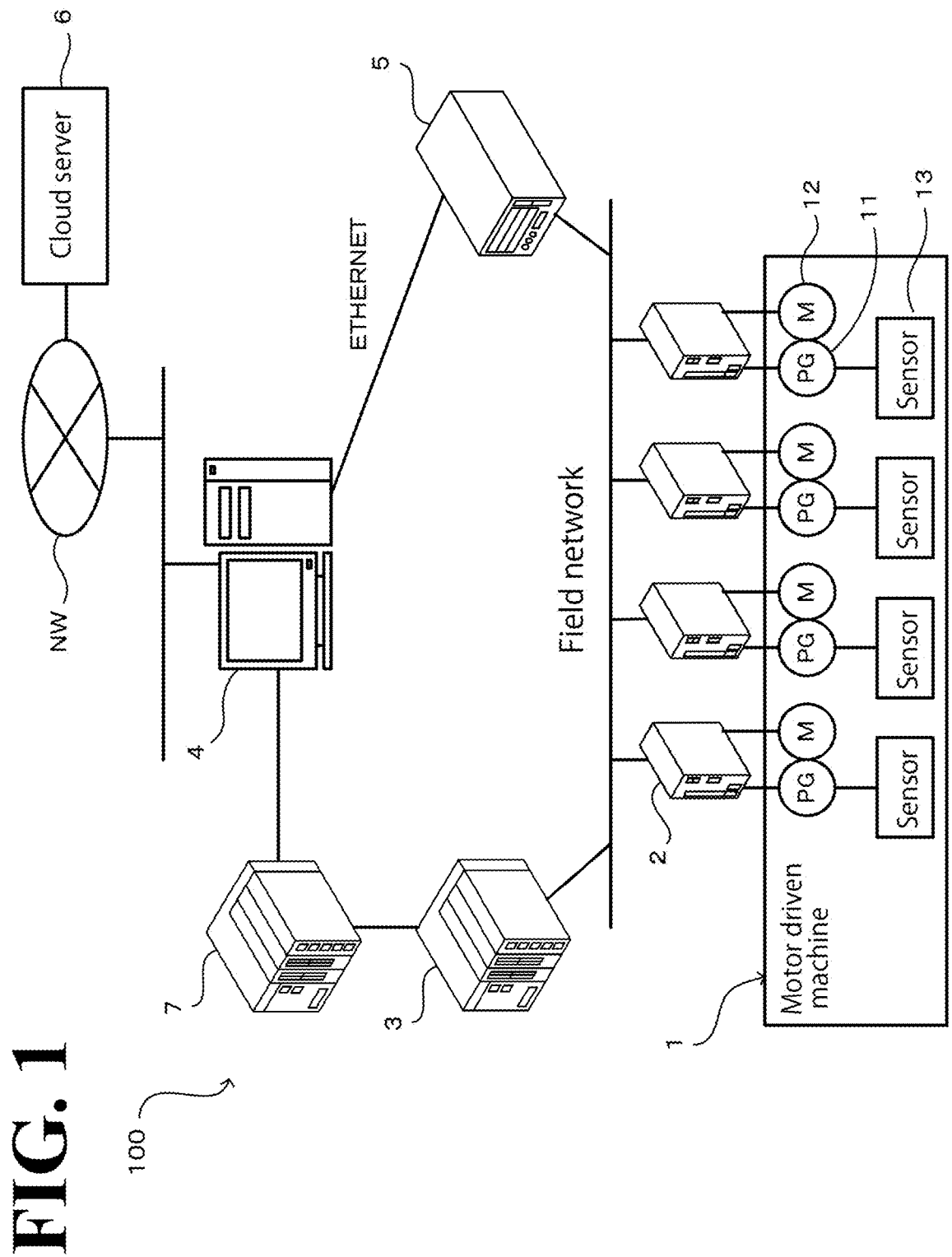
FIG. 1 is a schematic illustrating a system configuration of an abnormality determination system according to an embodiment.

The embodiments will now be described with reference to the accompanying drawings, wherein like reference numerals designate corresponding or identical elements throughout the various drawings.

1: General Arrangement of Abnormality Determination System

By referring to FIG. 1, a general arrangement of an abnormality determination system 100 according to this embodiment will be described.

FIG. 1 is a schematic illustrating a system configuration of an abnormality determination system 100. The abnormality determination system 100 is a system that controls driving of machine systems, such as manufacturing machines, disposed in factories, plants, and other industrial facilities. The abnormality determination system 100 also obtains operation data of the machine systems and detects an operation abnormality in the machine systems. As illustrated in FIG. 1, the abnormality determination system 100 includes a motor driven machine 1, servo amplifiers 2, an upper-level controller 3, an edge server 4, a data collection module 5, and an upper-level commander 7.

The motor driven machine 1 is a target machine system in which the abnormality determination system 100 determines whether there are various kinds of driving-related abnormality. The motor driven machine 1 includes a plurality of motors 12 (four motors 12 in the embodiment illustrated in FIG. 1) and driven mechanisms (not illustrated) driven by the respective motors 12. Each of the motors 12 includes an encoder 11. Thus, the motor driven machine 1 is a multi-axis machine system. Specifically, the motors 12 are controlled at different operation patterns into coordination as a whole. In this embodiment, each motor 12 is a rotary electric motor, and the encoder 11 is a sensor that optically detects the rotation angle of the motor 12 and outputs the detected rotation angle. It will be understood by those skilled in the art that the motor 12 will not be limited to a rotary motor but may be a "linear motor", which makes linear motion. In the case of a rotary motor, the linear motor includes an angle detection sensor, instead of the encoder 11. A non-limiting example of the angle detection sensor is a linear scale (not illustrated). In this embodiment, the motor driven machine 1 also includes external sensors 13 (each simply termed "sensor" in FIG. 1). The external sensors 13 are capable of detecting various state quantities associated with the driving control of the motors 12. Examples of the state quantities include, but are not limited to, vibration, instrument temperature, environment temperature, and environment humidity of the motors 12 and the motor driven machine 1. Each external sensor 13 is connected to a corresponding encoder 11 through a "field network", such as Σ-LINK (registered trademark), so that information can be transmitted and received between the external sensor 13 and the encoder 11. It will be understood by those skilled in the art that the motor driven machine 1 will not be limited to the above-described machine system that uses a plurality of axes to implement driving control. Another possible example is a uni-axis machine system (not illustrated).

The servo amplifiers 2 (motor controller) correspond to the respective motors 12, and generate driving electric power based on a motor control command input from the upper-level controller 3 (upper-level controller), described later. Each servo amplifier 2 feeds the generated driving electric power to the corresponding motor 12 to control driving of the motor 12. In this embodiment, each servo amplifier 2 obtains, in some order, two kinds of time-series data as operation data and transmits the operation data to an external instrument (see FIGS. 2 and 4, described later). The operation data are a torque command and an output speed. The torque command is generated while the driving electric power is being fed to the motor 12. The output speed is generated based on the angle of the motor 12 output from the encoder 11. In this embodiment, each servo amplifier 2 also compares the obtained operation data with reference data stored in advance in a storage so as to determine whether the motor driven machine 1 has an operation abnormality. This function of detecting an operation abnormality will be detailed later.

The upper-level controller 3 controls the motor driven machine 1 to perform a desired time-dependent driving operation by successively generating and outputting motor control commands for the motors 12, such as output angle commands. These functions of the upper-level controller 3 to generate and output the motor control commands are based on upper-level control commands input from the upper-level commander 7, described later. Specifically, the timings of starting and stopping the motor control commands and parameters for the motor control commands are set based on the upper-level control commands. In this embodiment, the upper-level controller 3 is connected to the servo amplifiers 2 through a "field network" dedicated to signal communication between machine control-purpose system components so that information can be transmitted and received between the upper-level controller 3 and the servo amplifiers 2. A non-limiting example of such field network is MECHATROLINK (registered trademark).

The edge server 4 (data manager) is implemented by, for example, a desktop general-purpose personal computer to manage and control the abnormality determination system 100 as a whole based on an input operation (access) by a user. Specifically, as illustrated in FIG. 1, the edge server 4 is connected to the data collection module 5, described later, through ETHERNET (registered trademark) so that the edge server 4 obtains operation data from the servo amplifiers 2 and stores and manages the operation data. Among the operation data, the edge server 4 uses normal driving-time operation data, described later, as a basis for generating reference data used for detecting a data abnormality. The processing of generating the reference data will be detailed later. Also as illustrated in FIG. 1, the edge server 4 is connected to an external cloud server 6 through a wide-area network NW, such as the Internet, so that information can be transmitted and received between the edge server 4 and the cloud server 6. This configuration enables the edge server 4 to transmit to the cloud server 6 operation data, abnormality detection information, and/or other information stored in the edge server 4. Alternatively, the edge server 4 may be disconnected from the cloud server 6 in security-valued network applications.

The data collection module 5 (data transmitter-receptor) serves as a relay through which information such as various kinds of data and notification information are transmitted and received between the edge server 4 and the servo amplifiers 2. In this embodiment, the data collection module 5 is one of the terminals, including the servo amplifiers 2, that are connected to the above-described field network MECHATROLINK. This configuration enables the data collection module 5 to transmit and receive various kinds of data to and from the servo amplifiers 2 in a parallel, real-time manner. The data collection module 5 is also connected to the edge server 4 through the ETHERNET. This configuration enables the data collection module 5 to transmit and receive various kinds of data to and from the edge server 4 at high speed. Thus, the data collection module 5 accommodates to differences in communications standards and processing cycle between the edge server 4 and the servo amplifiers 2, making a smooth relay of various kinds of data between the edge server 4 and the servo amplifiers 2. One difference in communications standards is data transmission characteristics; a typical field network (which is the side of the servo amplifiers 2) is short in access period and narrow in transmission bandwidth, whereas the ETHERNET (registered trademark) (which is the side of the edge server 4) is long in access period and wide in transmission bandwidth. In light of the different data transmission characteristics between communications standards, the data collection module 5 appropriately performs data buffering and synchronization control of data transmission and reception so that a large amount of data is smoothly transmitted and received between the different communications standards.

The upper-level commander 7 is made up of a general-purpose personal computer, a Programmable Logic Controller (PLC), and other elements. With this configuration, the upper-level commander 7 controls the motor driven machine 1 as a whole to be activated and stopped. Specifically, the upper-level commander 7 refers to operation data, abnormality determination results, and other information stored in the edge server 4 so as to monitor the operation status of the motor driven machine 1. Based on the operation status, the upper-level commander 7 generates an upper-level control command, and transmits the upper-level control command to the upper-level controller 3. The upper-level control command causes the upper-level controller 3 to start and stop generating and outputting a motor control command (so as to activate or stop the motor driven machine 1 as a whole), or causes the upper-level controller 3 to set various parameters for the motor control command.

2: Features of this Embodiment

In a typical system for controlling driving of a motor driven machine, an upper-level controller generates and transmits a motor control command to a servo amplifier, and the servo amplifier controls the motor of the motor driven machine based on the motor control command. This configuration ensures sequence control of the motor driven machine in an operation pattern that combines a wide variety of motor control commands in a time-series manner. When there are a plurality of motors to drive the motor driven machine, a single upper-level controller generates and transmits a motor control command to each of servo amplifiers corresponding to the respective motors. This configuration ensures sequence control of the motor driven machine 1 as a whole with the motors driven in coordination.

If the motor driven machine is made to run for a long period of time, an operation abnormality caused by aging degradation or a similar phenomenon is more liable to occur. In light of the circumstances, there is a need for an abnormality determination function capable of detecting aging-caused, small operation abnormalities as early as possible, before such operation abnormalities accumulate to cause a critical failure of the motor driven machine 1 as a whole. Also, from a data-driven technology development standpoint, there is a need for obtaining, in a real-time manner, a large amount of sensor data successively detected by various sensors, transmitting the sensor data to an upper-level data manager (such as the edge server 4 and the cloud server 6), and storing the sensor data in the upper-level data manager.

However, the CPU of the upper-level controller has limited processing resources (throughput), which makes it difficult for the single upper-level controller to perform the additional processings of determining whether each of the plurality of motors has a driving operation abnormality and successively obtaining and storing sensor data, simultaneously with the above-described main processing of generating and transmitting motor control commands for the plurality of servo amplifiers.

In light of the circumstances, the abnormality determination system 100 according to this embodiment includes the servo amplifiers 2. Each servo amplifier 2 controls the motor 12 based on a motor control command received from the upper-level controller 3, and compares operation data obtained in controlling the motor 12 with reference data stored in advance in a storage so as to determine whether the motor driven machine 1 has an operation abnormality. The abnormality determination system 100 also includes the data collection module 5, which transmits and receives the reference data and the operation data to and from the servo amplifiers 2.

In the abnormality determination system 100, each of the servo amplifiers 2 independently and simultaneously performs the processings of obtaining operation data from the motor 12 corresponding to the servo amplifier 2 and detecting an operation abnormality. Also, the data collection module 5 collects and manages the operation data obtained by each servo amplifier 2. In this respect, each servo amplifier 2 readily detects an operation abnormality by comparing the operation data and the reference data with each other using, for example, Hotelling's $T^2$ test. This processing can be implemented within the capacity (processing resources) of the CPU that usually comes with each servo amplifier 2. Also, the data collection module 5 is dedicated to receiving and managing the operation data successively obtained by the servo amplifiers 2. This configuration ensures that, even when there are a large number motors 12 to drive the motor driven machine 1, the upper-level controller 3 is able to focus on its main processing of generating and transmitting motor control commands for the servo amplifiers 2, eliminating or minimizing an increase in processing load. This function will be described in detail below.

3: Information Transmitted and Received in Each Phase

In order to make the abnormality determination system 100 ready for determining whether the motor driven machine 1 has an operation abnormality, it is necessary to cause the abnormality determination system 100 to go through two preparation phases. A first preparation phase of the two preparation phases is to obtain normal operation data, described later, at the servo amplifiers 2. A second preparation phase of the two preparation phases is to generate reference data based on the obtained normal operation data and to store the reference data in the servo amplifiers 2. After the two preparation phases, the abnormality determination system 100 enters operational phase of performing abnormality determination while performing usual driving control of the motor driven machine 1. By referring to FIGS. 2 to 4, description will be made with regard to processings performed by the system components and flows of information in the phases. To avoid complicated illustration, the external sensor 13 and other elements illustrated in FIG. 1 are omitted in FIGS. 2 to 4.

3-1: First Preparation Phase

The first preparation phase is performed while the motor driven machine 1 is being driven normally. A non-limiting example of normal driving of the motor driven machine 1 is that the motor driven machine 1 is driven under a firm assumption that the motor driven machine 1 would operate approximately as designed (as initial practice or test practice), without operation abnormalities, because the motor driven machine 1 has undergone sufficient post-assembly adjustments.

Figure 2:
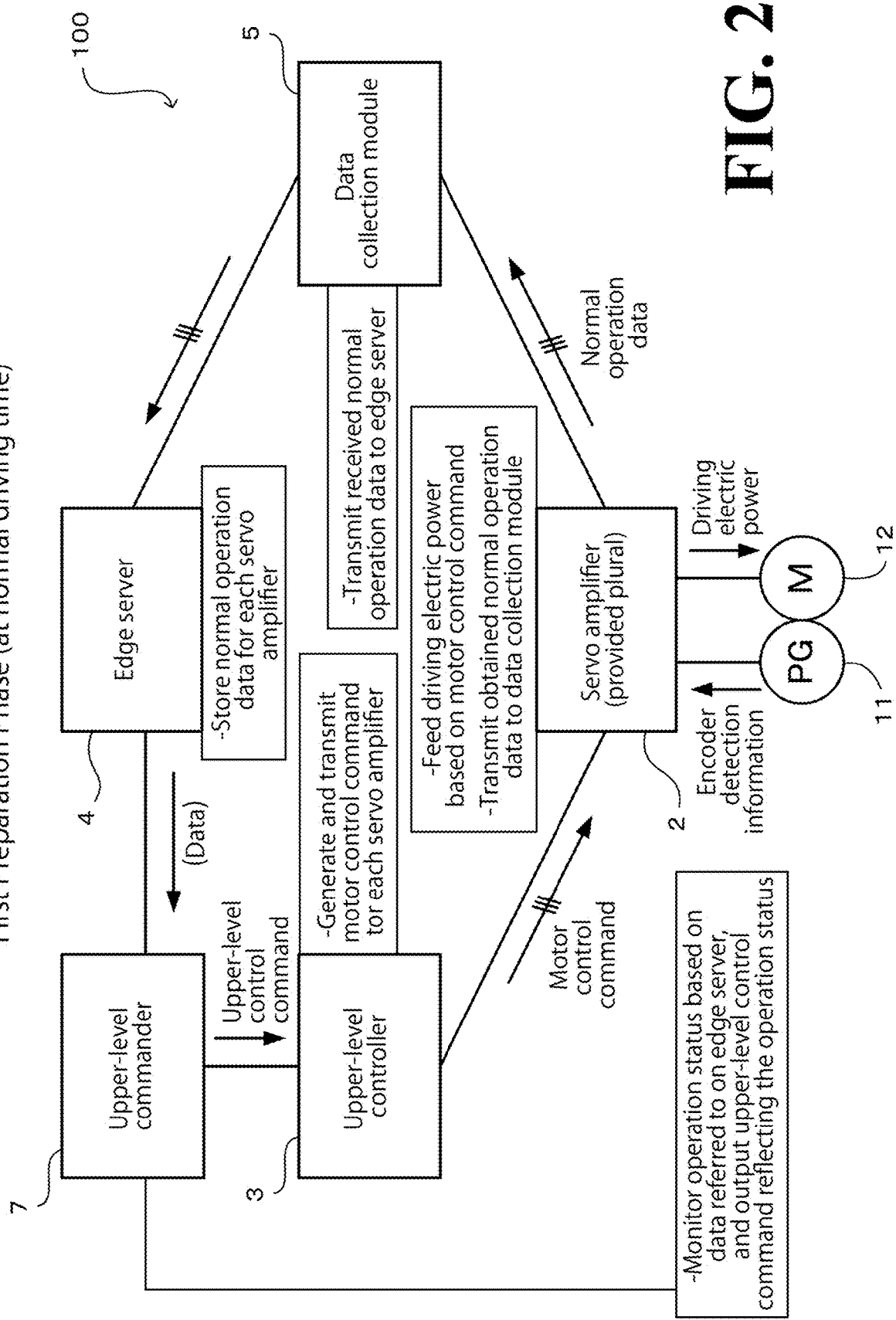
FIG. 2 illustrates details of processings performed by system components of the abnormality determination system in a first preparation phase, which is performed at the time of normal driving, and illustrates flows of information exchanged between the system components in the first preparation phase.

FIG. 2 illustrates details of processings performed by the system components in the first preparation phase, which is performed at the time of normal driving of the motor driven machine 1, and illustrates flows of information exchanged between the system components in the first preparation phase. Referring to FIG. 2, the upper-level commander 7 first transmits an upper-level control command to the upper-level controller 3 to cause the upper-level controller 3 to activate the motor driven machine 1 as a whole. Upon receipt of the upper-level control command, the upper-level controller 3 transmits motor control commands to the individual servo amplifiers 2 (only one servo amplifier 2 is illustrated for simplicity reasons, which also applies in the following description).

Based on the received motor control command, each of the servo amplifiers 2 generates driving electric power while referring to detection information obtained by the encoder 11 corresponding to the servo amplifier 2. Then, the servo amplifier 2 feeds the driving electric power to the motor 12 corresponding to the servo amplifier 2. Also in the first preparation phase, the servo amplifier 2 successively obtains two kinds of time-series data as a combination of normal operation data. Examples of the two kinds of time-series data include a torque command generated in the process of driving electric power feeding, and an output speed of the motor 12 calculated based on the detection information obtained by the encoder 11. Upon receipt of an operation data obtaining command from the data collection module 5, the servo amplifier 2 transmits all the normal operation data to the data collection module 5. The data collection module 5 sorts the received normal operation data according to servo amplifier 2 and transmits the sorted normal operation data to the edge server 4. The edge server 4 stores the received normal operation data, as sorted according to servo amplifier 2. In this embodiment, particular normal operation data is obtained, transmitted, and stored as determination reference-use normal operation data. The determination reference-use normal operation data is among normal operation data that are obtained within a predetermined period of time in which the motor driven machine 1 operates in a predetermined determination operation pattern (predetermined operation pattern). Also in this embodiment, the determination operation pattern is set in a plurality of kinds of patterns. For example, the determination operation pattern may be an operation pattern in which the motor driven machine 1 operates in normal operation, or may be an operation pattern in which the motor driven machine 1 operates only in the first preparation phase (which is an operation pattern dedicated to preparation of the reference data, described later).

Thus, in the first preparation phase, all the normal operation data obtained by the servo amplifiers 2 while the motor driven machine 1 is being driven normally are sorted according to servo amplifier 2 and stored in the edge server 4. Among the stored normal operation data, the normal operation data obtained while the motor driven machine 1 is being driving-controlled in the above-described determination operation pattern is distinguished as determination reference-use normal operation data.

3-2: Second Preparation Phase

The second preparation phase is performed after a determination is made that a sufficient amount of normal operation data from the servo amplifiers 2 has accumulated in the edge server 4 in the first preparation phase. In the second preparation phase, the upper-level controller 3 transmits no motor control command, leaving the motor driven machine 1 stationary.

Figure 3:
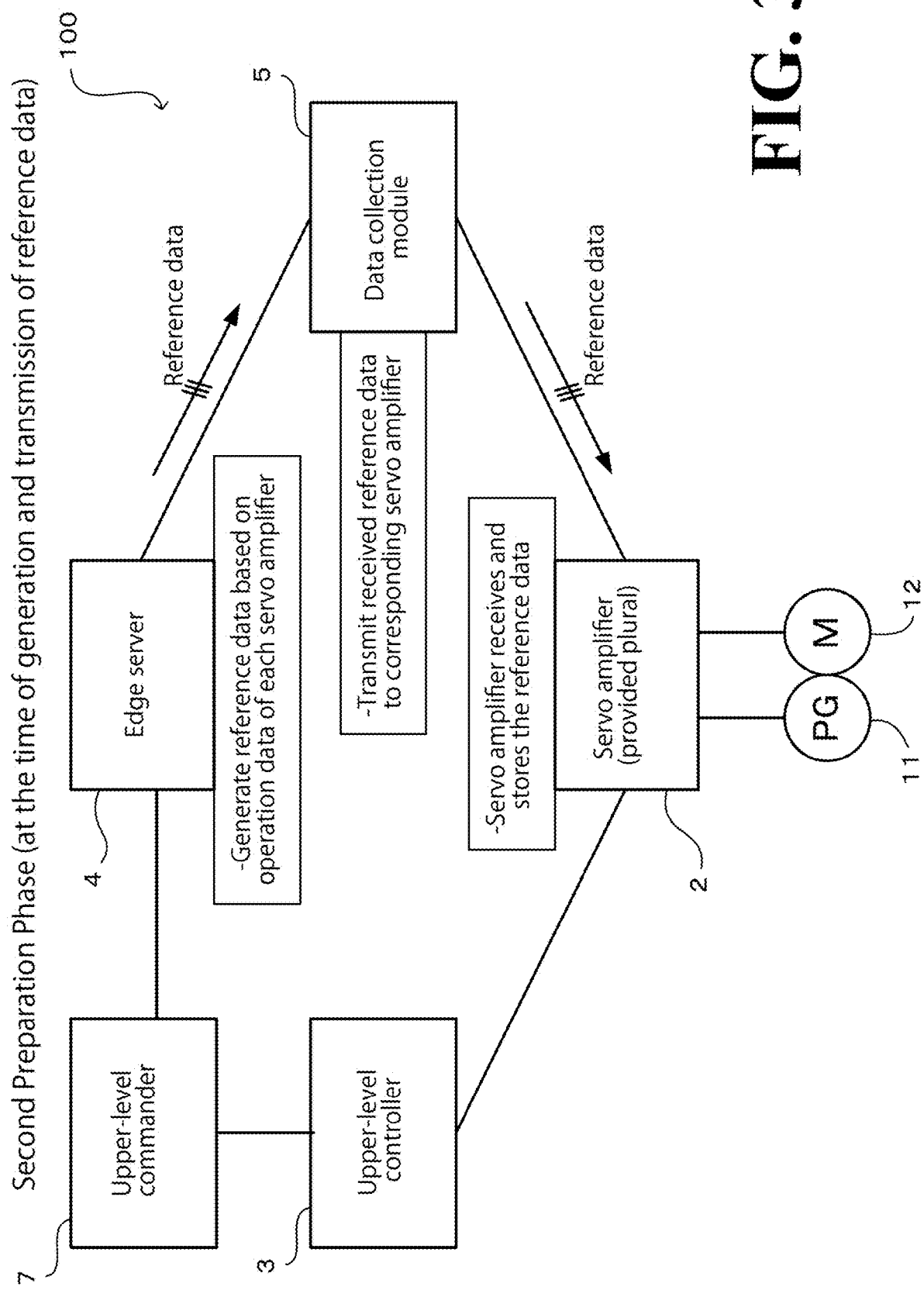
FIG. 3 illustrates details of processings performed by the system components in a second preparation phase, and illustrates flows of information exchanged between the system components in the second preparation phase.

FIG. 3 illustrates details of processings performed by the system components in the second preparation phase, and illustrates flows of information exchanged between the system components in the second preparation phase. Referring to FIG. 3, the edge server 4 stores determination reference-use normal operation data sorted according to servo amplifier 2, and based on the determination reference-use normal operation data, generates reference data for each servo amplifier 2. Then, the edge server 4 transmits the reference data to the data collection module 5. The data collection module 5 transmits the received reference data to the servo amplifier 2. The servo amplifier 2 stores the received reference data.

Thus, in the second preparation phase, reference data is generated based on determination reference-use normal operation data obtained for each of the servo amplifiers 2, and the reference data is stored in the corresponding servo amplifier 2.

3-3: Operational Phase

The operational phase is performed at the time of observation driving, which is after the reference data corresponding to all the servo amplifiers 2 have been stored in the second preparation phase. A non-limiting example of the time of observation driving is when the motor driven machine 1 has run for a long period of time enough for an operation abnormality to occur (working operation).

Figure 4:
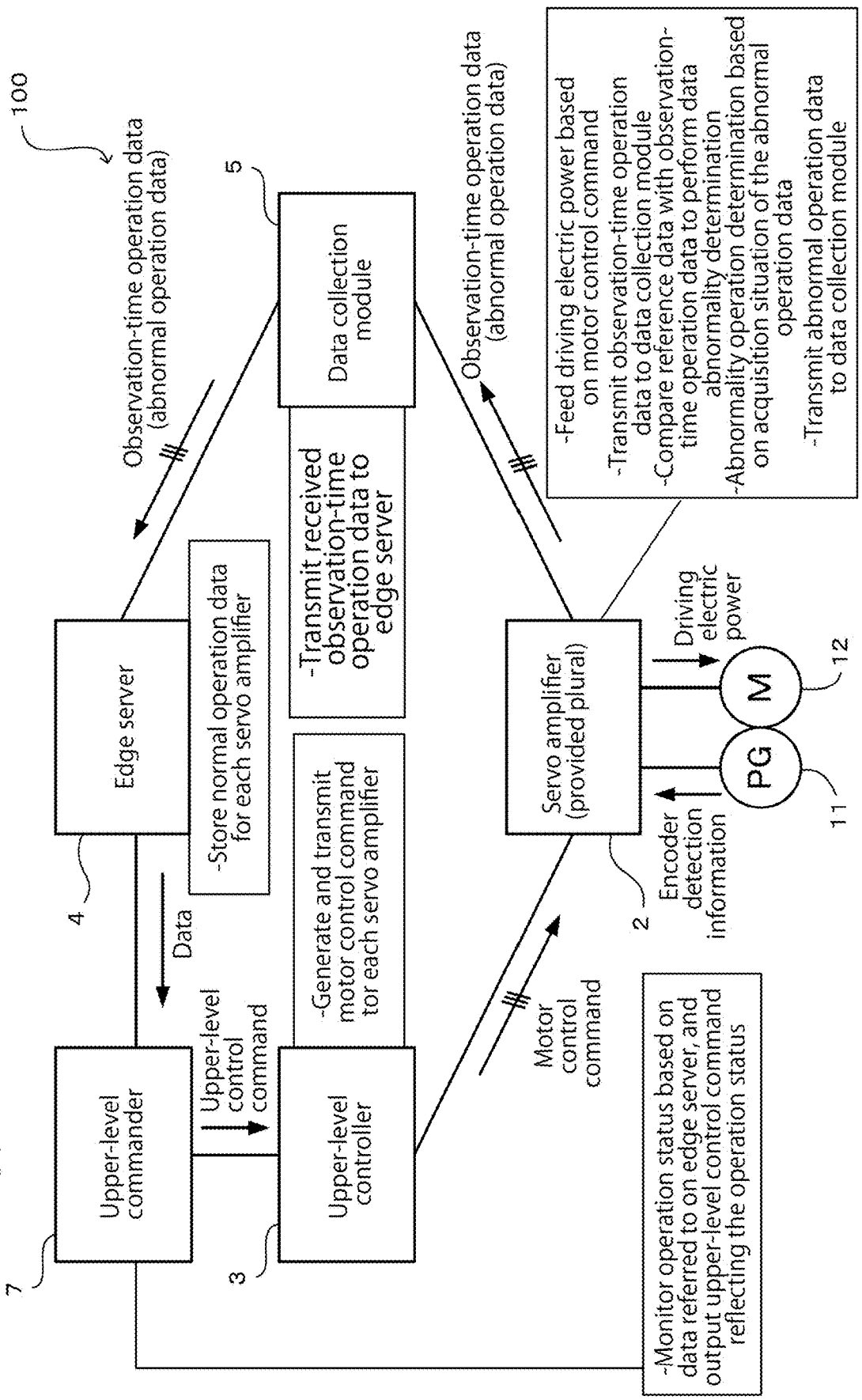
FIG. 4 illustrates details of processings performed by the system components in an operational phase, which is performed at the time of observation driving, and illustrates flows of information exchanged between the system components in the operational phase.

FIG. 4 illustrates details of processings performed by the system components in the operational phase, and illustrates flows of information exchanged between the system components. Referring to FIG. 4, the upper-level commander 7 first transmits an upper-level control command to the upper-level controller 3 to cause the upper-level controller 3 to activate the motor driven machine 1 as a whole. Upon receipt of the upper-level control command, the upper-level controller 3 transmits motor control commands to the individual servo amplifiers 2. Based on the received motor control command, each of the servo amplifiers 2 generates driving electric power while referring to detection information obtained by the encoder 11 corresponding to the servo amplifier 2. Then, the servo amplifier 2 feeds the driving electric power to the motor 12 corresponding to the servo amplifier 2. This causes normal driving control of the motor driven machine 1.

Also in the operational phase, the servo amplifier 2 successively obtains two kinds of time-series data as a combination of normal operation data. Examples of the two kinds of time-series data include the above-described torque command and the above-described output speed of the motor 12. Then, the servo amplifier 2 transmits all the observation-time operation data to the data collection module 5. The data collection module 5 sorts the received observation-time operation data according to servo amplifier 2 and transmits the sorted observation-time operation data to the edge server 4. The edge server 4 stores the received observation-time operation data, as sorted according to servo amplifier 2.

In this embodiment, particular observation-time operation data is obtained within a predetermined period of time in which the motor driven machine 1 operates in the above-described determination operation pattern, and each servo amplifier 2 compares the observation-time operation data with already-stored reference data so as to determine whether an operation abnormality has occurred in the motor driven machine 1. As to where in the motor driven machine 1 an operation abnormality might be determined as existing, mechanical portions of the motor driven machine 1, more specifically, movable portions driven by the motors 12, which are controlled by the servo amplifiers 2, and portions surrounding the movable portions are subjected to operation abnormality determination.

In this embodiment, the operation abnormality determination is a two-stage process made up of data abnormality determination and operation abnormality determination. The data abnormality determination is to compare observation-time operation data obtained during driving control in a determination operation pattern with reference data, so as to determine whether the observation-time operation data has a data abnormality. The operation abnormality determination is to determine whether an operation abnormality is finally occurring based on an acquisition situation in which the observation-time operation data determined as having a data abnormality was obtained. The data abnormality determination and the operation abnormality determination will be detailed later. When it has been determined that there is an operation abnormality, the servo amplifier 2 performs predetermined notification processing. At the same time, the servo amplifier 2 distinguishes, as abnormal operation data, the observation-time operation data determined as having an operation abnormality, and transmits the abnormal operation data to the data collection module 5. Then, the abnormal operation data is stored in the edge server 4. As described above, not only the abnormal operation data but also normal observation-time operation data are transmitted to the data collection module 5 and stored in the edge server 4.

Thus, in the operational phase, all observation-time operation data are sorted according to servo amplifier 2 and stored in the edge server 4, simultaneously with usual driving control of the motor driven machine 1. When an operation abnormality has occurred in a movable portion and/or a portion surrounding the movable portion driven by the motor 12, the servo amplifier 2 corresponding to the motor 12 determines that the operation abnormality is occurring and makes a notification of the occurrence. At the same time, the observation-time operation data in the determination operation pattern is stored in the edge server 4 as abnormal operation data.

4: How to Make Abnormality Determination

Description will be made with regard to how the servo amplifiers 2 and the edge server 4 cooperate with each other to make abnormality determination (abnormality detection) in the motor driven machine 1.

Examples of the state quantities detectable by the servo amplifiers 2 include, but are not limited to, torque input into the motors 12, speed and angle output from the motors 12, and detection information obtained by the external sensor 13. In particular, by checking torque continuously, an operation abnormality caused by aging degradation or a similar phenomenon can be detected, possibly because in angle/speed control, torque is influenced by reaction force at the motor driven machine 1. In this embodiment, a statistical approach using machine learning is used to detect a change in an observed waveform.

However, an abnormality detected by machine learning is a state determined as abnormal directly from data obtained instantaneously. In this respect, machine systems such as the motor driven machine 1 may be displaced in every very short period of time, making continuous small displacements. Under some conditions, a machine system may be abnormal somewhere in the continuous small displacements and normal elsewhere in the continuous small displacements. This makes it necessary to determine whether there is an operation abnormality caused by aging degradation or a similar phenomenon all over the continuous small displacements. Also, it may not necessarily be appropriate to use a statistical approach alone to determine an abnormality in a machine system as a whole.

In light of the circumstances, the abnormality determination system 100 according to this embodiment distinguishes a data abnormality and an operation abnormality from each other. A data abnormality is a state determined by machine learning as abnormal directly from data. An operation abnormality is aging degradation, oscillation, or another state in the motor driven machine 1. Specifically, the abnormality determination system 100 obtains, during driving of the motor driven machine 1, time-series data associated with an input into and/or an output from the motors 12, and regards this time-series data as operation data. Then, the abnormality determination system 100 determines whether the operation data has a data abnormality. When the abnormality determination system 100 has determined that the operation data has a data abnormality, the abnormality determination system 100 determines whether the motor driven machine 1 has an operation abnormality based on an acquisition situation in which the operation data determined as having a data abnormality was obtained. Examples of the situation include, but are not limited to, the time at which the operation data was obtained, the vibration frequency at which the operation data was obtained, how often operation data has been obtained, and a combination in which the operation data was obtained. How to determine a state as a data abnormality and how to determine a state as an operation abnormality will be described below.

5: Data Abnormality Determination 5-1: Data Abnormality Determination by Machine Learning Generally, determination as to normality or abnormality in a waveform by human eye largely depends upon the experience of the observer. In contrast, machine learning uses a calculator to solve mathematical formulae representing human experience. A basic concept underlying detection of a change by machine learning is to prepare, as reference data, a normal distribution of a reference data group (the above-described normal operation data) and to check whether data obtained at an operational stage (the above-described observation-time operation data) is deviated from the normal distribution (reference data).

Figure 5:
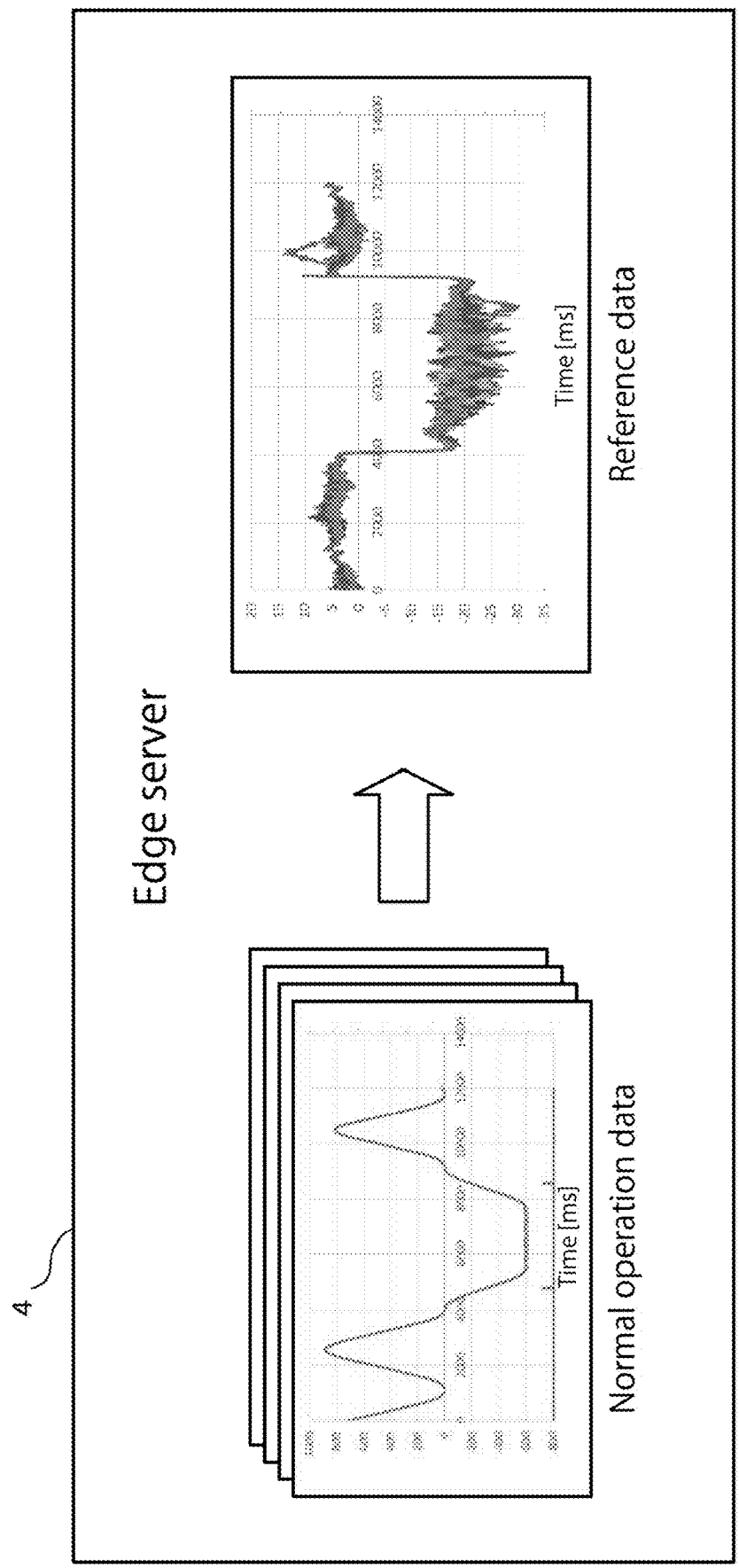
FIG. 5 illustrates exemplary normal operation data and exemplary reference data.

There are two possible types of reference data used in data abnormality determination. A first type of reference data is used under the assumption that all of the reference data is normal, and a second type of reference data is a mixture of data labeled as normal and data labeled as abnormal. To apply data abnormality determination to aging degradation of a mechanical part, a realistic approach would be to employ the assumption that all of the reference data is normal, since it would be difficult to prepare in advance abnormal reference data. In view of the circumstances, in this embodiment, reference data is prepared based on normal operation data all of which are firmly assumed as normal, as illustrated in FIG. 5. The graph of the reference data illustrated in FIG. 5 shows sample mean $\mu$, sample covariance matrix $\Sigma$, and data abnormality determination threshold $a_{th}$ on a time scale that is approximately the same as the time scale used in the graphs of the normal operation data.

Figure 6:
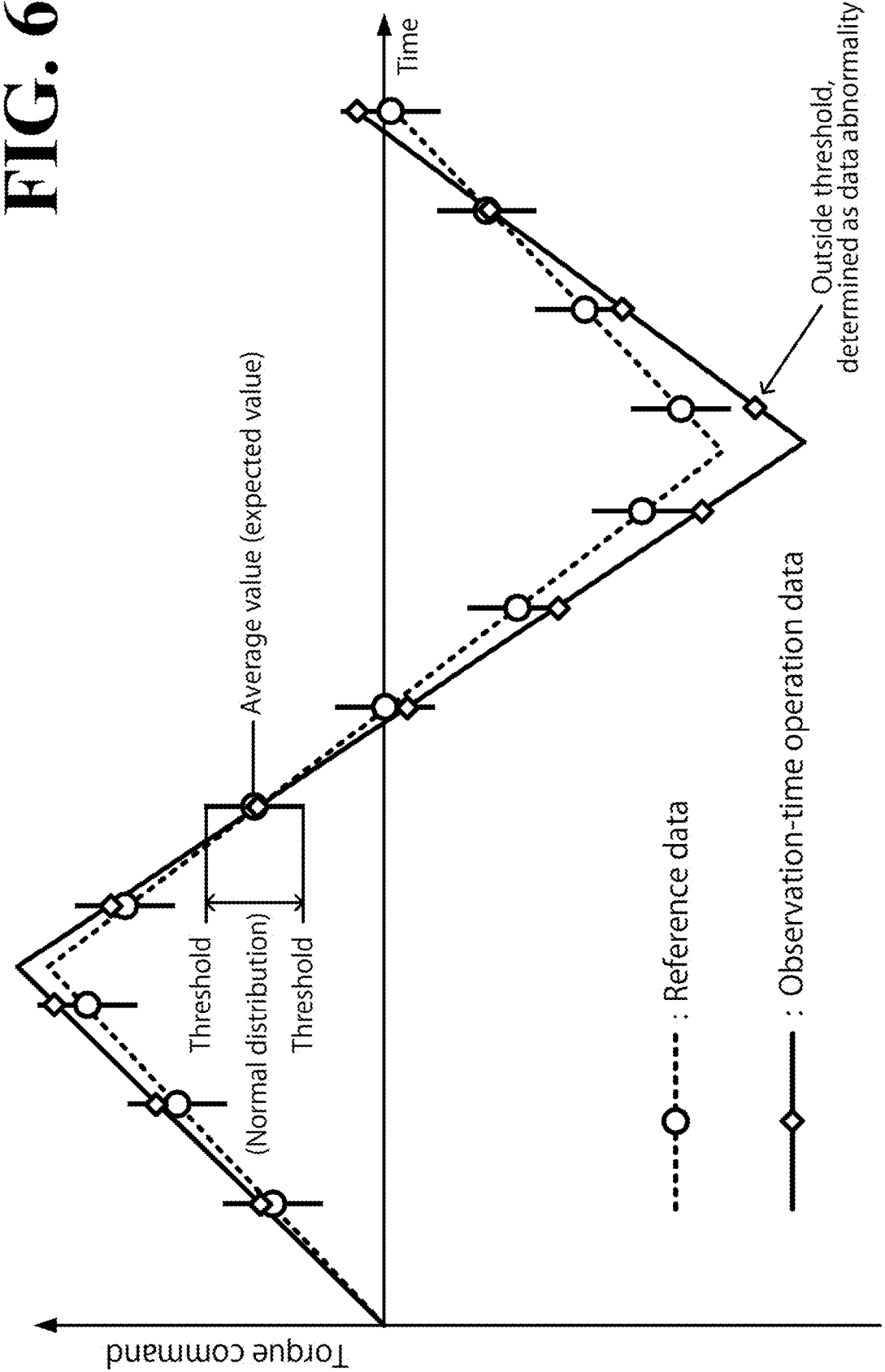
FIG. 6 illustrates a comparison between reference data and observation-time operation data of a torque command.

As illustrated in FIG. 6, a determination as to whether data is deviated from the normal distribution includes setting data abnormality determination thresholds at ends of a normal distribution, and checking whether the observation-time operation data is in excess of any of the data abnormality determination thresholds relative to the normal distribution center (average value, expected value). In this embodiment, the operation data is obtained in the form of two kinds of time-series data, namely, torque command and motor output speed, as described above, and data abnormality determination is performed for each of the two kinds of operation data. It should be noted, however, that FIG. 6 omits illustration of the motor output speed and, to facilitate illustration of the reference data, illustrates the reference data in simplified form, as opposed to the reference data illustrated in FIG. 5.

5-2: Hotelling's $T^2$ Test

In this embodiment, Hotelling's $T^2$ test is used to detect a change by machine learning. Hotelling's $T^2$ test is a method of multivariate analysis, which parallelly observes changing waveforms of a plurality of kinds of data. Hotelling's $T^2$ test has the following process of "Step 1" to "Step 6".

Step 1: Determine False Alarm Rate

False alarm rate $\alpha$, which is determined using normal data and abnormal data, is an indicator of how far data should be away from a normal distribution when the data is determined as abnormal data. For example, at a false alarm rate of 1%, $\alpha=0.01$. It will be understood by those skilled in the art that from a probabilistic and statistical point of view, the false alarm rate being zero means all the data being normal, and therefore that the false alarm rate $\alpha$ is not set at zero in principle.

Step 2: Calculate Chi-Squared Distribution

A chi-squared distribution is calculated by solving the following equation, where M denotes degree of freedom, and scale factor s=1. The degree of freedom M is a parameter specifying the number of kinds of independent reference data, that is, the number of kinds of variables in the above-described multivariate analysis. In this embodiment, there are two kinds of variables, torque command and motor output speed, which means M=2.

$$\chi^2(x \mid M, 1) = \frac{1}{2\Gamma\left(\frac{M}{2}\right)} \left(\frac{x}{2}\right)^{\frac{M}{2}-1} e^{-\frac{x}{2}}$$

In this equation, $\Gamma$ denotes a gamma function defined by the following equation.

$$\Gamma\left(\frac{M}{2}\right) = \int_0^\infty dt\, t^{\frac{M}{2}-1} e^{-t}$$

Step 3: Calculate Data Abnormality Determination Threshold

Using the false alarm rate $\alpha$ determined at "Step 1" and the chi-squared distribution calculated at "Step 2", a data abnormality determination threshold $a_{th}$ that satisfies the following equation is calculated.

$$1-\alpha = \int_0^{a_{th}} dx\, \chi^2(x \mid M, 1)$$

Step 4: Calculate Sample Mean and Sample Covariance Matrix

Using the reference data, which is normal data, the sample mean $\mu$ (the hat operator is omitted in the text, which also applies in the following description) and the sample covariance matrix $\Sigma$ (the hat operator is omitted in the text, which also applies in the following description) are calculated by solving the following equations.

$$\hat{\mu} = \frac{1}{N} \sum_{n=1}^{N} x^{(n)}$$

$$\hat{\Sigma} = \frac{1}{N} \sum_{n=1}^{N} (x^{(n)} - \hat{\mu})(x^{(n)} - \hat{\mu})^T$$

In the equations, $x^{(n)}$ denotes an n-th kind of reference data.

Step 5: Calculate Mahalanobis Distance

Based on the sample mean $\mu$ and the sample covariance matrix $\Sigma$ calculated at "Step 4" and based on observed data that has been detected, Mahalanobis distance $a(x')$ is calculated by solving the following equation.

$$a(x') = (x'-\hat{\mu})^T \hat{\Sigma}^{-1} (x'-\hat{\mu})$$

Step 6: Compare Data Abnormality Determination Threshold with Mahalanobis Distance The data abnormality determination threshold $a_{th}$ calculated at "Step 3" is compared with the Mahalanobis distance $a(x')$ calculated at "Step 5". When the Mahalanobis distance $a(x')$ is in excess of the data abnormality determination threshold $a_{th}$ ($a(x') > a_{th}$), the observed data used at "Step 5" is determined as having a data abnormality.

Figure 7:
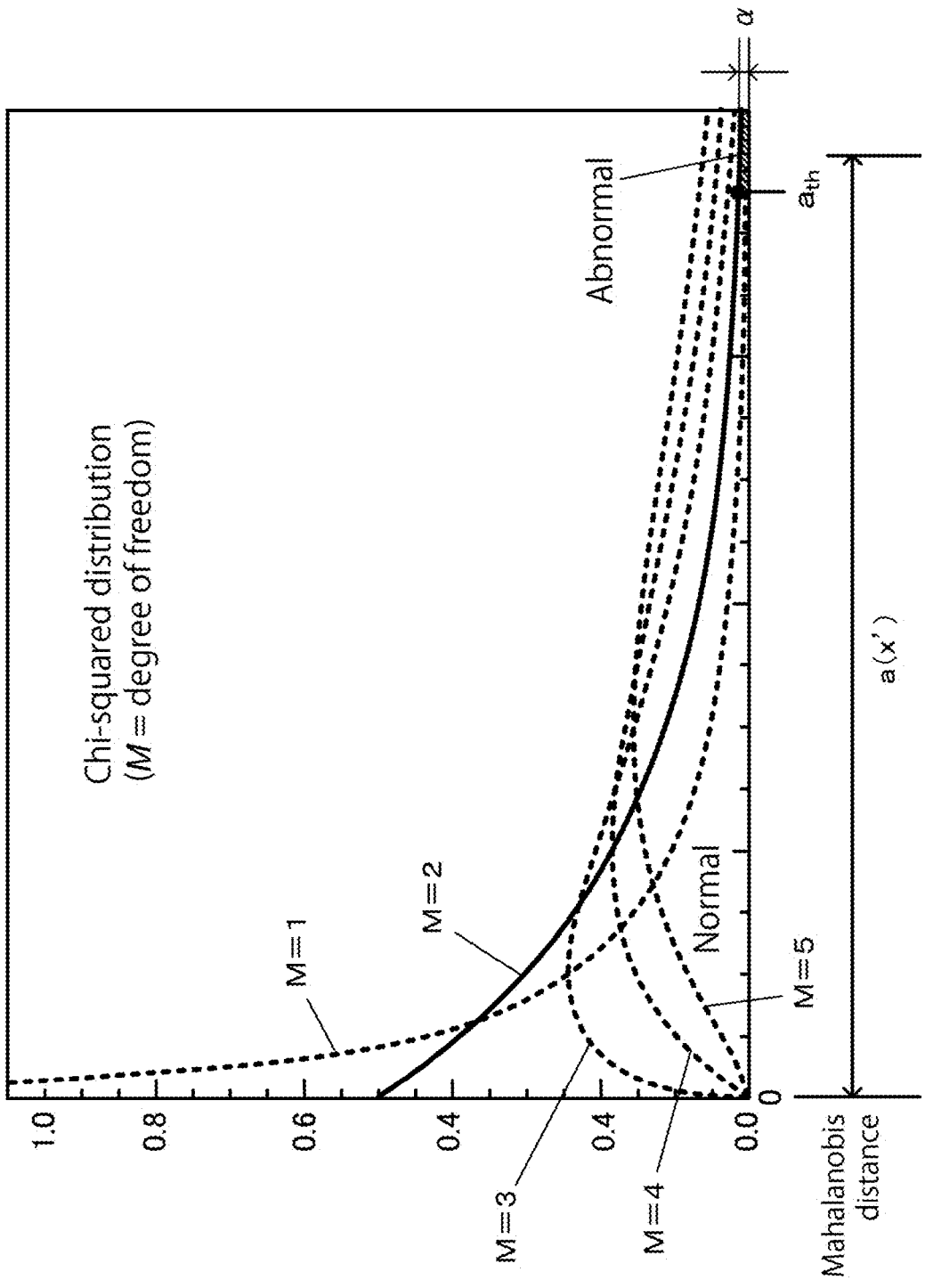
FIG. 7 illustrates a relationship between chi-squared distribution, data abnormality determination threshold, and Mahalanobis distance.

As illustrated in FIG. 7, chi-squared distributions are probability distributions variable depending on the degree of freedom M. Chi-squared distributions also are "reproductive", which is a property that makes chi-squared distributions suitable for multivariate analysis. For example, when operation data has two kinds of variables, as in this embodiment (torque command and motor output speed), then a chi-squared distribution at a degree of freedom M of 2 is used, as indicated by the solid line in FIG. 7. Referring to this chi-squared distribution, when the Mahalanobis distance $a(x')$ is greater than the data abnormality determination threshold $a_{th}$, which corresponds to the false alarm rate $\alpha$, the observation-time operation data used to calculate the Mahalanobis distance $a(x')$ can be regarded as having a data abnormality. That is, in a multivariate analysis in which the number of kinds of variables is two, the pluralisticity of how abnormal the combination of the two kinds of data is (how far the combination is from a normality) can be determined by integrated comparison between the data abnormality determination threshold $a_{th}$ and the Mahalanobis distance $a(x')$. It will be understood by those skilled in the art that by using the sample mean $\mu$ and the sample covariance matrix $\Sigma$ to calculate the Mahalanobis distance $a(x')$, the influence of correlation between the normal distributions of the two kinds of operation data is canceled. It will also be understood by those skilled in the art that the data abnormality determination may be applied to each kind of operation data using Hotelling's $T^2$ test at a degree of freedom M of 1.

5-3: Details of Data Abnormality Determination

Assume here that data abnormality determination is performed without machine learning. In this case, it is necessary to prepare a normal distribution and a data abnormality determination threshold at predetermined time intervals. It is also necessary to calculate a normal distribution for observation-time operation data. In calculating a normal distribution, it is necessary to calculate an average value and a standard deviation, but since calculation of a standard deviation is complicated, it is not realistic to calculate a standard deviation in a real-time manner while operation data is being obtained. Also, the data abnormality determination threshold is set in accordance with the changing normal distribution while the operation data is being obtained, and thus takes different values over time.

In light of the circumstances, this embodiment employs machine learning to perform the following processing.

Preparation: Edge Server

1: Obtain a plurality of normal operation data.

2: Calculate the sample mean $\mu$ and the sample covariance matrix $\Sigma$ using the normal operation data group.

3: Calculate the data abnormality determination threshold $a_{th}$ using the false alarm rate $\alpha$ and the chi-squared distribution.

Data Abnormality Determination: Servo Amplifier

1: Obtain observation-time operation data.

2: Calculate Mahalanobis distance $a(x')$ for the observation-time operation data.

3: Determine the observation-time operation data as having a data abnormality if the Mahalanobis distance $a(x')$ is in excess of the data abnormality determination threshold $a_{th}$.

Thus, a method using machine learning includes calculating the sample mean $\mu$, the sample covariance matrix $\Sigma$, and the Mahalanobis distance $a(x')$, instead of calculating a normal distribution. These calculations are as simple as four basic arithmetic operations and thus do not constitute a serious processing load, even if these calculations are repeated at short time intervals over a long period of service of the motor driven machine 1. Also, the data abnormality determination threshold $a_{th}$, though complicated in formula, is a time-independent constant and thus need not be calculated more than once.

Thus, in this embodiment, it is the edge server 4, which is higher in versatility and CPU processing resources, that performs heavy-load processing such as calculating reference data (sample mean, sample covariance matrix, and data abnormality determination threshold) based on normal operation data. In contrast, it is the servo amplifiers 2, which are lower in CPU's excess processing resources, that perform light-load processing such as calculating the Mahalanobis distance based on the sample mean, the sample covariance matrix, and the observation-time operation data and comparing the data abnormality determination threshold with the Mahalanobis distance (that is, compare the reference data with the observation-time operation data) so as to determine whether a data abnormality is occurring in the observation-time operation data at the present point of time. Thus, processings are assigned to different elements in this embodiment. This configuration ensures that in the operational phase of the motor driven machine 1, each of the axes driving the motor driven machine 1 can be subjected to data abnormality determination in a functional and real-time manner.

6: Operation Abnormality Determination

The above-described determination as to whether there is a data abnormality in the observation-time operation data (that is, whether the observation-time operation data is normal or abnormal) is made in a binary manner using the observation-time operation data as it is seen at the time when the observation-time operation data is obtained. In this respect, the fact that a data abnormality has been detected should not be taken as an occurrence of operation abnormality in the machine system as a whole. When a data abnormality occurs a plurality of times, details of an operation abnormality can be estimated, at a primary level, based on situations of the occurrences. This embodiment employs the notion that the number of data abnormality occurrences gradually increases as aging degradation develops. That is, when the number of data abnormality occurrences has exceeded a predetermined value, the motor driven machine 1 is determined as having an operation abnormality caused by aging degradation.

Figure 8:
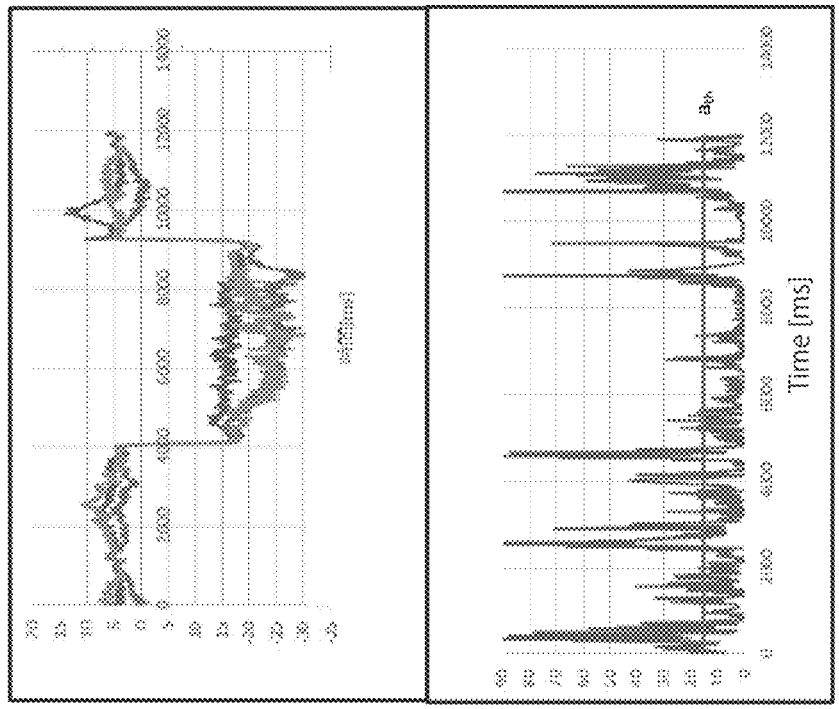
FIG. 8 illustrates an example of how a data abnormality is detected from observation-time operation data in determination as to whether there is an operation abnormality caused by aging degradation.

Specifically, as illustrated in FIG. 8, assume that the number of times the observation-time operation data is obtained during a period of driving of the motor driven machine 1 in a determination operation pattern is 1024. In this case, when the number of observation-time operation data detected as having a data abnormality is small (16 in the example illustrated in FIG. 8), the operation of the motor driven machine 1 is determined as normal. When the number of observation-time operation data detected as having a data abnormality is high (235 in the example illustrated in FIG. 8), the motor driven machine 1 is determined as having an operation abnormality. When the motor driven machine 1 is determined as having an operation abnormality, all the observation-time operation data obtained during the period of driving in the determination operation pattern are transmitted to the data collection module 5 as abnormal operation data.

Operation abnormalities caused by other than aging degradation can also be detected if a cause-effect relationship is understood between operation abnormality characteristics and situations in which data abnormalities are detected. For example, when both the observation-time operation data of torque command and the observation-time operation data of motor output speed are determined as having a data abnormality, oscillation of the motor driven machine 1 may be determined as the kind of operation abnormality. This configuration improves user-friendliness in that it is clear for a user that the machine abnormality to correct is oscillation. For further example, when the observation-time operation data of torque command is determined as having a data abnormality while the observation-time operation data of motor output speed is not determined as having a data abnormality, disturbance suppression (high friction) of the motor driven machine 1 may be determined as the kind of operation abnormality. For further example, when the observation-time operation data of torque command is not determined as having a data abnormality while the observation-time operation data of data abnormality is determined as having a data abnormality, machine wobbling of the motor driven machine 1 may be determined as the kind of operation abnormality.

7: Control Flow in Detail

Figure 9:
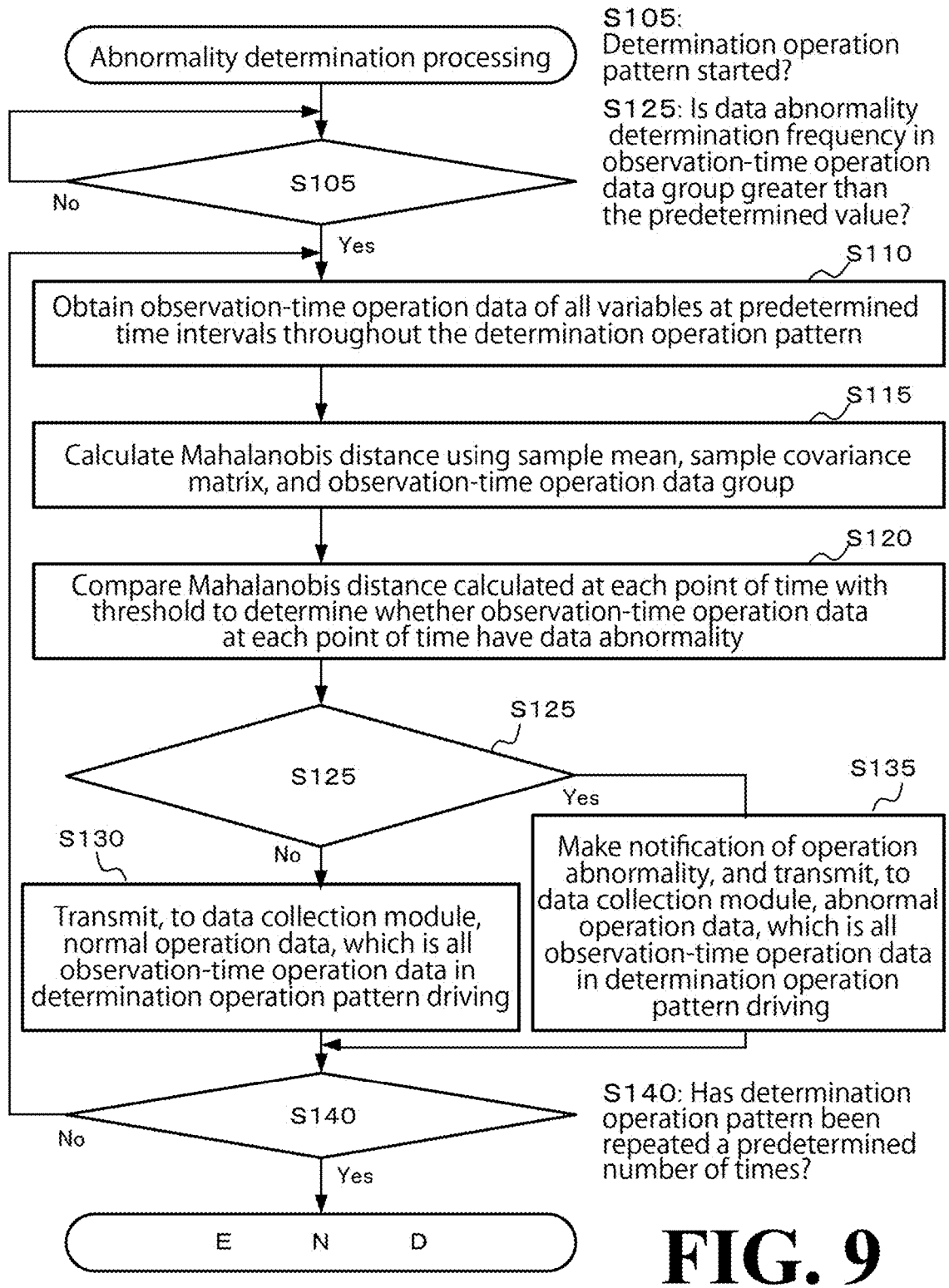
FIG. 9 is a flowchart of abnormality determination processing, which includes data abnormality determination and operation abnormality determination.

A control flow of determination as to operation abnormality caused by aging degradation will be detailed below. FIG. 9 is a flowchart of abnormality determination processing, which includes data abnormality determination and operation abnormality determination. The abnormality determination processing in the flowchart is performed by the CPU (not illustrated) of the servo amplifier 2 during observation driving (in the operational phase) of the motor driven machine 1, which is when a data abnormality is likely to occur. The abnormality determination processing in the flowchart is performed simultaneously with the servo amplifier 2's main processing (not illustrated) of feeding driving electric power based on a motor control command received from the upper-level controller 3. In particular, the abnormality determination processing is performed while the servo amplifier 2 is receiving a motor control command corresponding to a determination operation pattern.

At step S105, the CPU of the servo amplifier 2 receives from the upper-level controller 3 a motor control command corresponding to a determination operation pattern (normal operation-time operation pattern or reference data preparation-dedicated operation pattern). Then, the CPU of the servo amplifier 2 determines whether the main processing has caused driving of the motor 12. Then, the CPU of the servo amplifier 2 turns into a loop of waiting for driving in the determination operation pattern to start.

Next, at step S110, the CPU of the servo amplifier 2 obtains observation-time operation data of all the variables (torque command and motor output speed) at predetermined time intervals (such as every system cycle) throughout the determination operation pattern that is being performed. Then, the CPU of the servo amplifier 2 stores the observation-time operation data in a storage device such as RAM (not illustrated).

Next, at step S115, the CPU of the servo amplifier 2 calculates Mahalanobis distance a(x') at each point of observation time using the sample mean μ and the sample covariance matrix Σ stored in advance in the second preparation phase and using the observation-time operation data group obtained at above step S110.

Next, at step S120, the CPU of the servo amplifier 2 compares the Mahalanobis distance a(x') calculated at each point of observation time at above step S115 with the data abnormality determination threshold $a_{th}$ (simply termed "threshold" in FIG. 9) stored in advance in the second preparation phase so as to determine whether the Mahalanobis distance a(x') is in excess of the data abnormality determination threshold $a_{th}$. In other words, the CPU of the servo amplifier 2 determines whether the observation-time operation data obtained at each point of observation time at above step S110 has a data abnormality.

At step S125, the CPU of the servo amplifier 2 uses the observation-time operation data group equivalent to one determination operation pattern obtained at above step S110 to determine whether the determination frequency at which obtained observation-time operation data have been determined as having a data abnormality at above step S120 (how often observation-time operation data determined as abnormal has been obtained) is greater than a predetermined value (predetermined threshold). In other words, the CPU of the servo amplifier 2 determines whether an operation abnormality caused by aging degradation has occurred. When the data abnormality determination frequency is smaller than the predetermined value, the determination is "No", and the procedure proceeds to step S130. In other words, the CPU of the servo amplifier 2 determines that there is no operation abnormality aging degradation.

At step S130, the CPU of the servo amplifier 2 transmits to the data collection module 5 all the observation-time operation data obtained in the determination operation pattern as normal operation data, and the procedure proceeds to step S140.

When at step S125 the data abnormality determination frequency is greater than the predetermined value, the determination is "Yes", and the procedure proceeds to step S135. In other words, the CPU of the servo amplifier 2 determines that an operation abnormality caused by aging degradation has occurred.

At step S135, the CPU of the servo amplifier 2 notifies the edge server 4, through the data collection module 5, of the determination result that the motor driven machine 1 has an operation abnormality. At the same time, the CPU of the servo amplifier 2 transmits to the data collection module 5 all the observation-time operation data obtained in the determination operation pattern as abnormal operation data, and the procedure proceeds to step S140.

At step S140, the CPU of the servo amplifier 2 determines whether the determination operation pattern has been repeated a predetermined number of times. When the determination operation pattern has not been repeated the predetermined number of times yet, the determination is "No", and the processing flow returns to step S110.

When the determination operation pattern has been repeated the predetermined number of times, the determination is "Yes", and the processing flow ends.

The data abnormality determination processing (such as the processings at Steps 5 and 6) is comparatively small in calculation processing load. As in the flow of the abnormality determination processing, the data abnormality determination processing is performed by the servo amplifiers 2, which are comparatively low in CPU power, making the data abnormality determination processing less of a resource load on the abnormality determination system 100 as a whole. The abnormality determination processing is based on "batch processing", by which all the observation-time operation data equivalent to one determination operation pattern are obtained first, and then the observation-time operation data are subjected to data abnormality determination at each point of observation time. It will be understood by those skilled in the art, however, that the abnormality determination processing will not be limited to the "batch processing". Another non-limiting example is "real-time processing" (not illustrated), by which every time observation-time operation data is obtained, the observation-time operation data is subjected to data abnormality determination.

8: Advantageous Effects of this Embodiment

As has been described hereinbefore, the abnormality determination system 100 according to this embodiment includes the servo amplifiers 2. The servo amplifiers 2 control the motors 12 based on a motor control command received from the upper-level controller 3. The servo amplifiers 2 also compare operation data obtained in controlling the motors 12 with reference data stored in advance in a storage so as to determine whether the motor driven machine 1 has an operation abnormality. The abnormality determination system 100 also includes the data collection module 5. The data collection module 5 transmits and receives the reference data and the operation data to and from the servo amplifiers 2.

In the abnormality determination system 100, each of the servo amplifiers 2 independently and simultaneously performs the processings of obtaining operation data associated with control of the motor 12 corresponding to the servo amplifier 2 and detecting an operation abnormality. Also, the data collection module 5 collects and manages the operation data obtained by each servo amplifier 2. In this respect, each servo amplifier 2 readily detects an operation abnormality by comparing the operation data and the reference data with each other using, for example, Hotelling's $T^2$ test. This processing can be implemented within the processing resources of the CPU of each servo amplifier 2. Also, the data collection module 5 is dedicated to receiving and managing the operation data successively obtained by the servo amplifiers 2. This configuration ensures that, even when there are a large number motors 12 to drive the motor driven machine 1, the upper-level controller 3 is able to focus on its main processing of generating and transmitting motor control commands for the servo amplifiers 2, eliminating or minimizing an increase in processing load. This configuration, as a result, ensures stable abnormality determination and stable data collection, with eliminated or minimized increase in processing load on the upper-level controller 3.

The abnormality determination system 100 also includes the edge server 4. The edge server 4 transmits an upper-level control command to the upper-level controller 3, and transmits and receives the reference data and the operation data to and from the data collection module 5. The edge server 4 also compares the operation data with the reference data so as to determine whether the motor driven machine 1 has an operation abnormality. Providing the abnormality determination system 100 with the edge server 4 enables the user to access the edge server 4, browse the operation data associated with control of the motors 12, and monitor the operation data for occurrence of operation abnormality. Also, in preparation for operation abnormality detection, the processing of generating the reference data, which involves a large amount of processing load, is assigned to the edge server 4, which has a large amount of processing resources. Thus, processing load is dispersed over the abnormality determination system 100. The edge server 4 is also capable of transmitting to the cloud server 6 a detection status of operation abnormality and operation data stored in the edge server 4. This configuration ensures that management of operation abnormality detection and operation data collection in a plurality of motor driven machines 1 is centralized at the cloud server 6.

Also in this embodiment, each servo amplifier 2 determines whether the operation data has a data abnormality using reference data generated by machine learning, determines whether the motor driven machine 1 has an operation abnormality based on an acquisition situation in which the operation data determined as having the data abnormality was obtained, and transmits abnormal operation data to the data collection module 5. The abnormal operation data includes the operation data obtained when the motor driven machine 1 was determined as having the operation abnormality. This configuration enables the CPU of the servo amplifier 2, which is lower in excess processing resources, to readily perform operation abnormality determination by the processing of comparing the obtained operation data with the reference data. Also, the data collection module 5 and the edge server 4 receive abnormal operation data as distinguished from normal operation data. This configuration enables the data collection module 5 and the edge server 4 to recognize an operation abnormality in the servo amplifier 2 from which the abnormal operation data has been obtained and to browse and monitor the abnormal operation data as distinguished from operation data.

Also in this embodiment, the reference data is calculated for each of a plurality of determination operation patterns based on normal operation data obtained while the motor driven machine 1 is being driven normally. That is, only those reference data that correspond to the determination operation patterns (normal operation-time operation pattern or reference data preparation-dedicated operation pattern) need to be stored for reference use. This configuration greatly reduces the load on the servo amplifiers 2, such as CPU's processing load and the memory's capacity load.

It will be understood by those skilled in the art that upon receipt of a command to obtain operation data through the data collection module 5, each of the servo amplifier 2 may obtain the operation data and transmit the obtained operation data to the data collection module 5 (this configuration is not illustrated). This configuration enables each servo amplifier 2 to receive the operation data-obtaining command and transmit the operation data through the data collection module 5 according to a desired time schedule managed by the edge server 4 or another device external to the servo amplifier 2.

Also in this embodiment, the data collection module 5 transmits to the servo amplifiers 2 reference data received from the edge server 4, receives from the servo amplifiers 2 operation data obtained by the servo amplifiers 2, and transmits the operation data to the edge server 4. This configuration ensures that the data collection module 5 is dedicated to receiving and managing the operation data successively obtained by the servo amplifiers 2. This configuration ensures that, even when there are a large number motors 12 to drive the motor driven machine 1, the upper-level controller 3 is able to focus on its main processing of generating and transmitting motor control commands for the servo amplifiers 2, eliminating or minimizing an increase in processing load.

Also in this embodiment, each of the servo amplifiers 2 controls the corresponding motor 12 of the motor driven machine 1, and compares observation-time operation data with reference data. The observation-time operation data is obtained from the motor 12 (the encoder 11) while the motor driven machine 1 is being driven for observation purposes. The reference data is calculated based on normal operation data obtained from the motor 12 while the motor driven machine 1 is being driven normally. By this comparison, each servo amplifier 2 determines whether the motor driven machine 1 has an operation abnormality. This configuration ensures that, even though the CPU of the servo amplifier 2 is lower in excess processing resources because of the CPU's usual motor control processing, the CPU of the servo amplifier 2 is able to readily perform operation abnormality determination by the processing of comparing the obtained operation data with the reference data. Also, the reference data stored for reference use is small in capacity. This configuration greatly reduces the load on the servo amplifiers 2, such as CPU's processing load and the memory's capacity load.

Also in this embodiment, the method for determining whether the motor driven machine 1 has an operation abnormality includes: obtaining observation-time operation data of each of the motors 12 while the motor driven machine 1 is being driven for observation purposes; determining whether the observation-time operation data has a data abnormality using reference data generated by machine learning; and determining whether the motor driven machine 1 has an operation abnormality based on an acquisition situation in which the observation-time operation data determined as having the data abnormality was obtained. Thus, in implementing predictor diagnosis for operation abnormality in motion-system machine control of the motor driven machine 1, data abnormality and operation abnormality are distinguished from each other, and determination is made as to whether the motor driven machine has an operation abnormality based on an acquisition situation in which the data abnormality occurred (an acquisition situation in which the abnormal operation data determined as having a data abnormality was obtained). This configuration makes small changes in data abnormality less influential in the determination as to operation abnormality in the motor driven machine 1 as a whole, making the determination more effective, more detailed, and more definite. Also, an operation abnormality can be readily detected by the processing of comparing reference data generated by machine learning with the observation-time operation data. This configuration reduces the processing load on the CPU of the servo amplifier 2 in performing the method for determining an abnormality according to this embodiment.

As described above, an acquisition situation in which the operation data determined as having a data abnormality was obtained is used as a basis for the determination as to operation abnormality. It will be understood by those skilled in the art that the acquisition situation will not be limited to how often such operation data has been obtained. The acquisition situation may vary depending on the target of operation abnormality determination. Other non-limiting examples of the acquisition situation (determination situation) include, but are not limited to, the time at which the operation data was obtained, the vibration frequency at which the operation data was obtained, and a combination in which the abnormal operation data was obtained.

Also in this embodiment, the reference data includes a sample mean and a sample covariance matrix that are calculated based on a predetermined data abnormality determination threshold and normal operation data obtained while the motor driven machine 1 is being driven normally.

The determination as to data abnormality includes: calculating a Mahalanobis distance based on the sample mean, the sample covariance matrix, and the observation-time operation data; and comparing the data abnormality determination threshold with the Mahalanobis distance, so as to determine whether the observation-time operation data has a data abnormality. This configuration is based on machine learning using a "supervised learning" technique with Hotelling's $T^2$ test, and thus improves the reliability of data abnormality determination. In this method for determining a data abnormality using Hotelling's $T^2$ test, the processing performed by the servo amplifiers 2 of successively comparing reference data and observation-time operation data (which includes calculating Mahalanobis distance and comparing Mahalanobis distance with data abnormality determination threshold) is advantageously lower in operation processing load than other machine learning techniques such as deep learning. This makes it practical that the CPU of the servo amplifier 2, which is lower in excess processing resources, is able to make highly reliable operation abnormality determination, simultaneously with the main processing of feeding driving electric power to the motor 12.

9: Modifications

Figure 10:
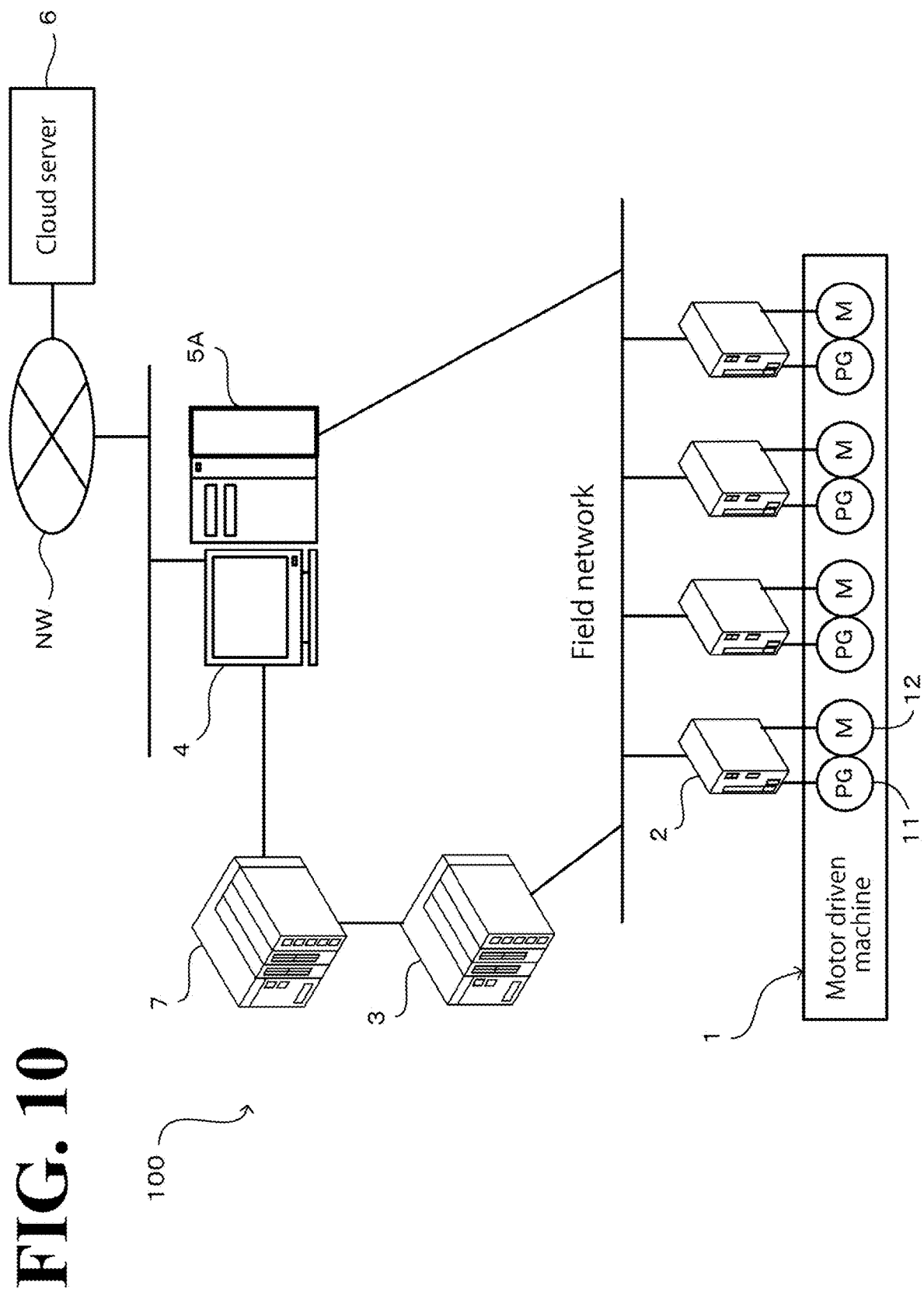
FIG. 10 illustrates a system configuration in which a data collection module is integral to an edge server.
Figure 11:
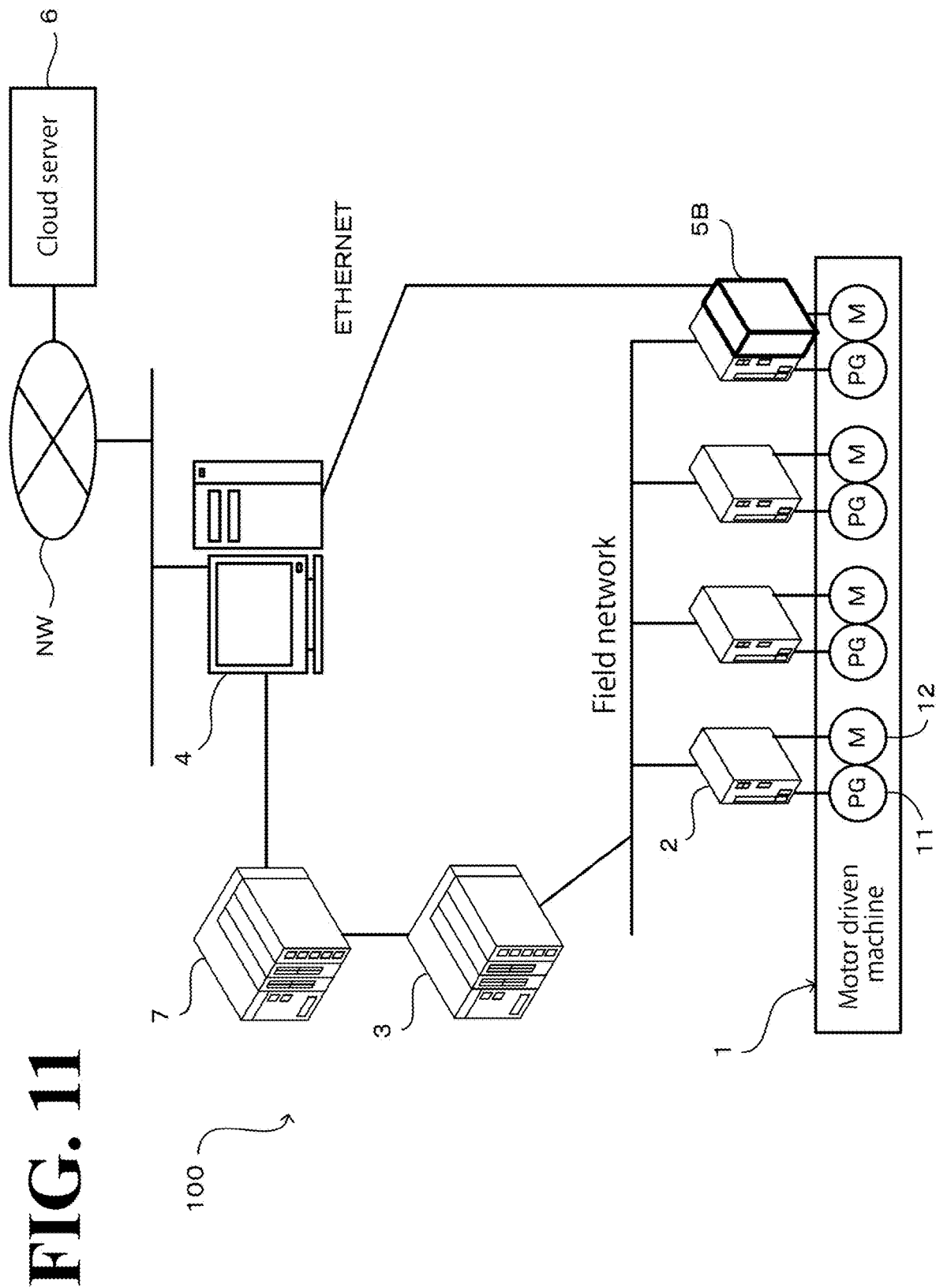
FIG. 11 illustrates a system configuration in which the data collection module is integral to a servo amplifier.
Figure 12:
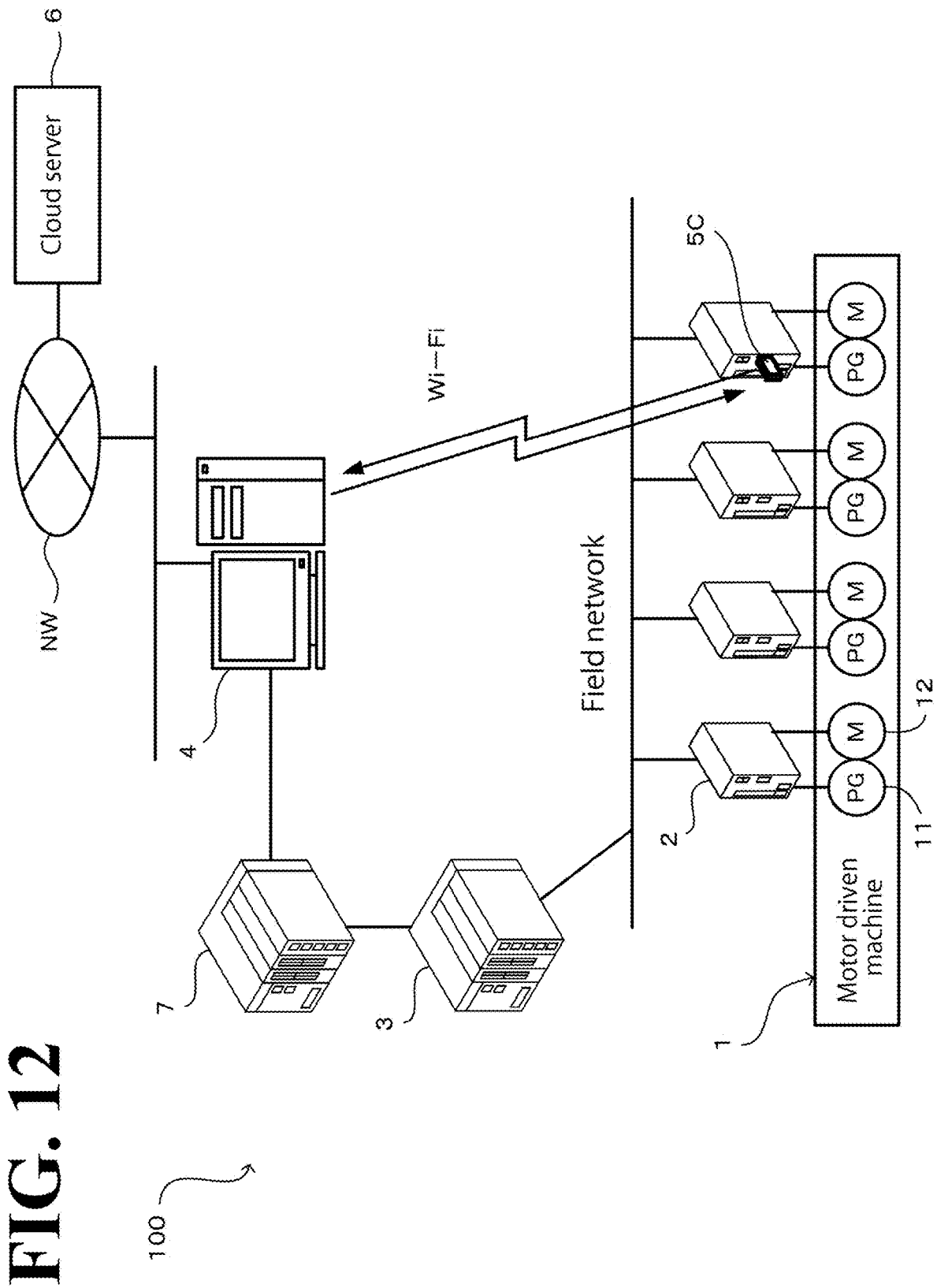
FIG. 12 illustrates a system configuration in which the data collection module is integral to the servo amplifier and transmits and receives data to and from the edge server through a wireless communication.

Modifications of the above-described embodiment will be described by referring to the system configurations illustrated in FIGS. 10 to 12, which correspond to FIG. 1. Referring to FIGS. 10 to 12, each data collection module 5 has a modified form, which provides advantageous effects similar to the advantageous effects of the above-described embodiment. To avoid complicated illustration, the external sensor 13 and other elements illustrated in FIG. 1 are omitted in FIGS. 10 to 12.

FIG. 10 illustrates a system configuration in which a data collection module 5A integral to the edge server 4. In this case, the data collection module 5A is fitted with the edge server 4 in the form of an add-in (expansion) board or a peripheral. Many general-purpose personal computers (PC), including the edge server 4, are not equipped with a terminal, a processing function, and other elements necessary for direct connection with a field network such as MECHATROLINK (registered trademark). In view of the circumstances, in this modification, the data collection module 5A functions as an interface that enables data to be transmitted and received to and from the edge server 4 through an inside bus and a shared memory. This configuration eliminates the need for a network path, such as the above-described ETHERNET (registered trademark), between the edge server 4 and the data collection module 5A, resulting in simplified wiring in the system as a whole and increased speed of data transmission-reception through the inside bus, the shared memory share, and other associated elements.

FIG. 11 illustrates a system configuration in which a data collection module 5B is integral to a servo amplifier 2. In this case, the data collection module 5B is fitted with the servo amplifier 2 in the form of an add-in (expansion) board or a peripheral. This configuration eliminates the need for a network path between the servo amplifier 2 and the data collection module 5B, resulting in simplified wiring in the system as a whole and increased speed of data transmission-reception through the inside bus, the shared memory share, and other associated elements. When a machine system includes a plurality of servo amplifiers, the data collection module 5B may be fitted with any one servo amplifier among the plurality of servo amplifiers. In this case, the other servo amplifiers connected to the one servo amplifier through a field network may transmit obtained operation data to the data collection module 5B through the field network and the one servo amplifier 2.

The configuration illustrated in FIG. 12 is one effective form of the data collection module 5 fitted with a servo amplifier 2. Referring to FIG. 12, a data collection module 5C transmits and receives data to and from the edge server 4 through a wireless communication. Specifically, the data collection module 5C is configured in the form of a "USB dongle" connected to a USB terminal of the servo amplifier 2, and the data collection module 5C and the edge server 4 transmit and receive data to and from each other through a wireless local area network (LAN) such Wi-Fi (registered trademark) and Bluetooth (registered trademark). This configuration ensures that a servo amplifier 2 located at a position where wiring to the edge server 4 is difficult is able to transmit and receive data to and from the edge server 4 through the wireless communication implemented by the data collection module 5C.

While in the above-described embodiment and modifications the edge server 4 calculates reference data, another possible embodiment is that the data collection module 5 calculates reference data. Also, while in the above-described embodiment and modifications the servo amplifier 2 and the motor 12 are independent of each other, the servo amplifier 2 and the motor 12 may be integral to each other in the form of a "motor with built-in amplifier" (in which a servo amplifier is integral to the motor and the encoder, not illustrated). In this configuration as well, the data transmission-reception configuration and the method for determining an abnormality according to the above-described embodiment and modifications may be applied. In this case, the motor with built-in amplifier is a non-limiting example of the motor and the motor controller recited in the appended claims. Also in the above-described embodiment and modifications, the operation data obtained and used for abnormality detection is made up of two kinds of data, torque command and motor output speed. It is also possible to obtain and use other data associated with control of the motors 12, such as any of various commands and state values, and state quantity data detected at the external sensor 13 or other devices. It is also possible to combine the commands, state values, and state quantity data in any manner deemed suitable.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. An abnormality determination system, comprising:
motor control circuitry configured to control a motor of a motor-driven machine based on a motor control command, and compare operation data of the motor obtained in controlling the motor with reference data stored in a storage to determine whether the motor driven machine has an operation abnormality;
upper-level control circuitry configured to transmit the motor control command to the motor control circuitry;
data transceiver circuitry configured to transmit and receive the reference data and the operation data to and from the motor control circuitry,
wherein the reference data comprises a plurality of reference data that are calculated based on normal operation data obtained while the motor-driven machine is being driven normally and that respectively correspond to a plurality of predetermined operation patterns.

2. The abnormality determination system according to claim 1, further comprising:
data management circuitry configured to transmit and receive the reference data and the operation data to and from the data transceiver circuitry and configured to compare the operation data with the reference data to determine whether the motor driven machine has the operation abnormality.

3. The abnormality determination system according to claim 2, wherein the data transceiver circuitry is integral to the data management circuitry.

4. The abnormality determination system according to claim 2, wherein the data transceiver circuitry is integral to the motor control circuitry and configured to transmit and receive the reference data and the operation data to and from the data management circuitry through a wireless communication.

5. The abnormality determination system according to claim 2, wherein the reference data is generated by machine learning, and the motor control circuitry is configured to determine whether the operation data has a data abnormality using the reference data generated by machine learning, determine whether the motor-driven machine has the operation abnormality based on an acquisition situation in which the operation data determined as having the data abnormality was obtained, and when the motor control circuitry has determined that the motor driven machine has the operation abnormality, transmit abnormal operation data to the data transceiver circuitry, the abnormal operation data comprising the operation data obtained when the motor-driven machine was determined to have the operation abnormality.

6. The abnormality determination system according to claim 5, wherein the reference data comprises a plurality of reference data that are calculated based on normal operation data obtained while the motor-driven machine is being driven normally and that respectively correspond to a plurality of predetermined operation patterns.

7. The abnormality determination system according to claim 5, wherein the motor control circuitry is further configured to receive, via the data transceiver circuitry, a command to obtain the operation data, and upon receipt of the command, the motor control circuitry is further configured to obtain the operation data and transmit the obtained operation data to the data transceiver circuitry.

8. The abnormality determination system according to claim 2, wherein the motor control circuitry is further configured to receive, via the data transceiver circuitry, a command to obtain the operation data, and upon receipt of the command, the motor control circuitry is further configured to obtain the operation data and transmit the obtained operation data to the data transceiver circuitry.

9. The abnormality determination system according to claim 1, wherein the reference data is generated by machine learning, and the motor control circuitry is configured to determine whether the operation data has a data abnormality using the reference data generated by machine learning, determine whether the motor-driven machine has the operation abnormality based on an acquisition situation in which the operation data determined as having the data abnormality was obtained, and when the motor control circuitry has determined that the motor driven machine has the operation abnormality, transmit abnormal operation data to the data transceiver circuitry, the abnormal operation data comprising the operation data obtained when the motor-driven machine was determined to have the operation abnormality.

10. The abnormality determination system according to claim 9, wherein the reference data comprises a plurality of reference data that are calculated based on normal operation data obtained while the motor-driven machine is being driven normally and that respectively correspond to a plurality of predetermined operation patterns.

11. The abnormality determination system according to claim 9, wherein the motor control circuitry is further configured to receive, via the data transceiver circuitry, a command to obtain the operation data, and upon receipt of the command, the motor control circuitry is further configured to obtain the operation data and transmit the obtained operation data to the data transceiver circuitry.

12. The abnormality determination system according to claim 1, wherein the motor control circuitry is further configured to receive, via the data transceiver circuitry, a command to obtain the operation data, and upon receipt of the command, the motor control circuitry is further configured to obtain the operation data and transmit the obtained operation data to the data transceiver circuitry.

13. The abnormality determination system according to claim 1, wherein the data transceiver circuitry is integral to the motor control circuitry.

14. The abnormality determination system according to claim 1, wherein the motor control circuitry is further configured to receive, via the data transceiver circuitry, a command to obtain the operation data, and upon receipt of the command, the motor control circuitry is further configured to obtain the operation data and transmit the obtained operation data to the data transceiver circuitry.

15. A method for determining an abnormality in a motor-driven machine, comprising:
obtaining observation-time operation data of a motor of the motor-driven machine, the observation-time operation data being operation data obtained while the motor driven machine is being driven for observation purposes;
determining whether the observation-time operation data has a data abnormality using reference data generated by machine learning; and
determining whether the motor driven machine has an operation abnormality based on an acquisition situation in which the observation-time operation data, determined as having the data abnormality, was obtained,
wherein the reference data comprises a plurality of reference data that are calculated based on normal operation data obtained while the motor-driven machine is being driven normally and that respectively correspond to a plurality of predetermined operation patterns.

16. The method according to claim 15, wherein the reference data includes a sample mean and a sample covariance matrix that are calculated based on a predetermined data abnormality determination threshold and normal operation data, the normal operation data being obtained while the motor-driven machine is being driven normally, and the determining whether the observation-time operation data has the data abnormality further comprises calculating a Mahalanobis distance based on the sample mean, the sample covariance matrix, and the observation-time operation data, and comparing the data abnormality determination threshold with the Mahalanobis distance, to determine whether the observation-time operation data has the data abnormality.

17. An apparatus, comprising:
data transmitter-receptor configured to receive reference data from data management circuitry, transmit the received reference data to motor control circuitry, receive operation data from the motor control circuitry, and transmit the received operation data to the data management circuitry,
wherein the reference data comprises a plurality of reference data that are calculated based on normal operation data obtained while the motor-driven machine is being driven normally and that respectively correspond to a plurality of predetermined operation patterns.

18. An apparatus, comprising:
motor control circuitry configured to control a motor of a motor-driven machine and configured to determine whether the motor-driven machine has an operation abnormality by comparing observation-time operation data of the motor with reference data,
wherein the observation-time operation data is obtained while the motor-driven machine is being driven for observation purposes, and the reference data is calculated based on normal operation data of the motor obtained while the motor driven machine is being driven normally,
wherein the reference data comprises a plurality of reference data that are calculated based on the normal operation data obtained while the motor-driven machine is being driven normally and that respectively correspond to a plurality of predetermined operation patterns.

* * * * *